United States Patent [19]

Slawyk et al.

[11] Patent Number: 4,507,444

[45] Date of Patent: Mar. 26, 1985

[54] HIGH-IMPACT POLYMER ALLOYS

[75] Inventors: Wilhelm Slawyk, Cologne; Gerhard Ballé, Leverkusen; Manfred Munzer, Bensheim; Adolf Wohnhas, deceased, late of Darmstadt-Arheilgen, all of Fed. Rep. of Germany, by Hannelor R. I. Wohnhas

[73] Assignee: Bayer Aktiengesellschaft, Leverkusen, Fed. Rep. of Germany

[21] Appl. No.: 295,177

[22] Filed: Aug. 21, 1981

Related U.S. Application Data

[63] Continuation of Ser. No. 095,821, Nov. 19, 1979, abandoned, which is a continuation of Ser. No. 016,633, Mar. 1, 1979, abandoned, which is a continuation of Ser. No. 915,705, Jun. 15, 1978, abandoned.

[30] Foreign Application Priority Data

Jun. 18, 1977 [DE] Fed. Rep. of Germany ....... 2727480

[51] Int. Cl.$^3$ .......................................... C08F 283/04
[52] U.S. Cl. ..................................... 525/455; 525/28; 525/399; 525/424; 525/439; 525/440; 525/454
[58] Field of Search ................. 525/28, 399, 424, 439, 525/440, 454, 455

[56] References Cited

U.S. PATENT DOCUMENTS 4,097,439 6/1978 Darling .............................. 260/31.2

Primary Examiner—Melvyn I. Marquis
Attorney, Agent, or Firm—Gene Harsh; Joseph C. Gil; Thomas W. Roy

[57] ABSTRACT

A process of making radically polymerizable compositions suitable for the production of impact resistant optically clear glass like plastic and forming the glass from such compositions is disclosed. Also taught are the polymerizable compositions and the final glass produced. An isocyanate terminated prepolymer based upon a polyol selected from polyesters, polyester amides, polycarbonates and polyacetals and diisocyanates selected from branched aliphatic isocyanates, cycloaliphatic isocyanates and aliphatic or cycloaliphatic isocyanates graft polymerized with vinyl monomers is chain extended with aliphatic or cyloaliphatic diamines while in solution in vinyl monomers consisting mainly of methacrylic acid esters. The chain extension is carried out with a deficit of amine and preferably to a viscosity at 20% solids in the vinyl monomers of between 200 and 30,000 cP at 20° C. The composition is then radically polymerized to form the high impact glass like plastic alloy.

19 Claims, No Drawings

HIGH-IMPACT POLYMER ALLOYS

This application is a continuation, of application Ser. No. 95,821, filed Nov. 19, 1979 which is in turn a continuation of application Ser. No. 16,633, filed Mar. 1, 1979 which in turn is a continuation of application Ser. No. 915,705, filed June 15, 1978, now all abandoned.

FIELD OF THE INVENTION

This invention relates to high-impact, glass-like plastics alloys of polymethacrylates and aliphatic polyurethane ureas.

BACKGROUND OF THE INVENTION

Processes for the production of glass-clear sheets from thermoplastic plastics by the radical addition polymerization of olefinically unsaturated monomers are known. They are based on the use of monomers which represent a solvent for the polymers thereof. Examples of such monomers are the esters of acrylic acid and methacrylic acid. In particular, processes for the production of glass-clear moldings by the bulk polymerization of methyl methacrylate have acquired commercial significance.

Despite the favorable optical and mechanical properties thereof, these materials are unsatisfactory on account of the brittleness thereof, i.e. the low resistance thereof to impact. Accordingly, there has been no shortage of attempts to produce polymethyl methacrylate moldings having the same favorable optical properties, but considerably improved impact strength and with the level of dimensional stability to heat substantially intact. Of the methods used for the high-impact modification of polymethyl methacrylate or methyl methacrylate copolymers, alloying with polyurethane elastomers is of particular interest because the properties of such combination materials are variable over wide ranges by virtue of the wide range of possible starting materials and variants of the production process.

It is known that cross-linked or linear polyurethane elastomers containing unsaturated or olefinic double bonds on the basis of polyether or polyester polyols and low molecular weight, aliphatic polyhydric alcohols may be produced by polyaddition in solution in vinyl monomers whose polymerization would normally lead to hard polymers having a high glass transition temperature, for example in methyl methacrylate or in monomer mixtures consisting predominantly of methyl methacrylate.

German Patent Publication No. 2,003,365 describes a process for the production of high-impact moldings from thermoplastic polymers, in which a cross-linked polyurethane is synthesized in a vinyl monomer or in a mixture of vinyl monomers by reacting polyisocyanates with polyfunctional compounds containing Zerewitinoff-active hydrogen atoms, after which the vinyl monomer is polymerized. Since, in this process, gels which may neither be cast nor shaped are obtained as an intermediate stage, shaping has to be completed before the polyaddition reaction has advanced to the cross-linked polyurethane stage. Accordingly, such a process may only be combined with difficulty with the now generally accepted process for the production of moldings, particularly sheets, by bulk polymerization.

In the course of further development of the above proposal, it was found that gelation of the polyurethane solutions could be avoided by selecting the polyurethane precursors for the functionality thereof in such a way that the concentration of the branching or cross-linking sites did not exceed a certain limit (German Patent Publication No. 2,312,973). In this process, however, it is not possible to rule out the danger of the formation of gels and other inhomogeneities which adversely affect the quality of the completed polymer products.

German Patent Publication No. 2,033,157 describes a process for the production of high-impact rigid polymers based on acrylic esters in which solutions of linear polyurethanes containing unsaturated groups accessible to copolymerization are produced from diisocyanates, aliphatic diols, relatively high molecular weight aliphatic polyester diols and isocyanate-monofunctional compounds containing an ethylenic double bond in a monomeric acrylic and/or methacrylic ester.

It has been found that the composite materials formed during the bulk polymerization of such solutions are made up of two phases, the polyurethane component representing the continuous phase and the polymethacrylate component the disperse phase, even with relatively low concentrations of polyurethane.

The observed phase structure makes it necessary to use polymers having optimal mechanical properties, particularly with regard to tensile and tear strength, elongation at break and elasticity and in regard to the dependence thereof upon temperature. It is known that these properties and the thermal stability under load of polyurethane elastomers may be improved by incorporating urea groups as so-called "hard segments" into the polymer chain. This may be done by using diamines in the synthesis of the elastomer, aliphatic and cycloaliphatic diamines being particularly suitable on account of the imperative color stability and resistance to weather.

However, methyl methacrylate or even less polar acrylic and methacrylic acid esters are relatively poor solvents for polyurethane urea elastomers of this type, as reflected, for example, in the very steep increase in solution viscosity with increasing content of urea groups in the polyurethane chain. The hard segments of the elastomer chains form crystalline associates which are firmly bound through hydrogen bridges and which cannot be kept in solution by poor solvents. This crystallization of the hard segments frequently results in clouding of the polyurethane monomer solutions and the moldings obtained from them by polymerization. Although the most widely used polyisocyanate for the production of light-stable polyurethanes, namely the readily obtainable hexamethylene diisocyanate, leads to high-quality elastomers, slightly clouded polyurethane urea solutions are formed during chain-extension with diamines in methyl methacrylate as solvent when using this diisocyanate. Although moldings produced from these solutions show excellent mechanical properties, they are unsuitable for the production of glass-clear sheets.

SUMMARY OF THE INVENTION

It has now been found that clear solutions of linear polyurethane-polyurea elastomers in monomeric methacrylic acid esters, above all methyl methacrylate, optionally in combination with small quantities of other copolymerizable monomers, such as acrylonitrile or methacrylonitrile, styrene or vinyl toluene or α-methyl styrene, may be obtained and fully polymerized to form clear sheets or other moldings by reacting aliphatic diisocyanates having a fairly complex, non-linear structure, alicyclic diisocyanates or aliphatic or alicyclic diisocyanates modified by graft polymerization with one or more vinyl monomers with relatively long chain polyester diols and aliphatic or alicyclic diamines as chain-extenders. It has also been found that, by using aromatic polyester diols or by using mixed polyesters of aliphatic and aromatic dicarboxylic acids, the refractive index of the elastomer phase may readily be matched with that of the thermoplastic phase, as a result of which an improvement in weathering resistance is additionally observed. It is possible to obtain a linkage between the polyurethane urea phase and the thermoplast phase in known manner by the incorporation of unsaturated groups which copolymerize with the monomer (mixture) present.

Accordingly, the present invention relates to a process for the production of high-impact polymer alloys by the radically initiated polymerization of homogeneous mixtures of:

(A) from about 40 to 92%, by weight of one or more monomeric esters of methacrylic acid and, optionally, small quantities of one or more copolymerizable vinyl monomers; and (B) from about 8 to 60%, by weight, of a substantially linear polyurethane urea elastomer; wherein the polyurethane urea elastomer is initially synthesized by polyaddition from:

(1) one or more substantially linear polyester, polyester amide, polyacetal or polycarbonate polyols, preferably a polyester diol based on:
   (a) from about 50 to 100 mol %, preferably from about 65 to 95 mol %, of optionally olefinically unsaturated aliphatic dicarboxylic acids; and
   (b) from about 0 to 50 mol %, preferably from about 5 to 35 mol %, of cycloaliphatic and/or aromatic dicarboxylic acids,
having a molecular weight of from about 500 to 6000, preferably from about 600 to 4000 and, with particular preference, from about 800 to 2500, preferably having a glass transition temperature of at most about $-20°$ C. and, optionally, from about 0 to 20 mol %, based on the entire polyol component, of diols having a molecular weight of from about 62 to 500;

(2) one or more aliphatic diisocyanates having a branched carbon skeleton of from about 7 to 36 carbon atoms, cycloaliphatic diisocyanates containing from about 5 to 25 carbon atoms and/or aliphatic or alicyclic diisocyanates modified by graft copolymerization with one or more vinyl monomers;

(3) one or more aliphatic or cycloaliphatic diamines; and, optionally, (4) a saturated or olefinically unsaturated compound with monofunctional reactivity to isocyanates; by preparing a prepolymer containing from about 1 to 5%, by weight, of NCO-groups from component (1) and (2) in a first stage, reacting the prepolymer dissolved in the polymerizable monomeric ester of acrylic acid with component (3) in a second stage in an $NCO/NH_2$ equivalent ratio of from about 1.01 to 1.5, preferably from about 1.1 to 1.4, optionally in the presence of other copolymerizable vinyl monomers, preferably until an about 20% solution of the polyurethane urea in the monomer has a viscosity of from about 200 to 30,000 cP at 20° C. optionally, reacting the free NCO-groups which may still be present in a third stage by the addition of component (4), adjusting the solids content of the solution to from about 8 to 60%, by weight, optionally by the addition of more vinyl monomers, and finally subjecting the mixture to a radically initiated polymerization reaction in known manner, optionally in molds.

On account of the imperative resistance to weathering, particularly in the case of sheets produced by bulk polymerization, the conventional polyether polyols cannot be used for synthesizing the polymer alloys according to the present invention.

According to the present invention, however, it is possible to use hydroxyl group-containing polycarbonates, polyester amides and polyacetals having a substantially linear structure and the above-mentioned molecular weight range as component (1).

DETAILED DESCRIPTION OF THE INVENTION

The polyesters containing hydroxyl groups which may be used in accordance with the present invention are, for example, reaction products of polyhydric, preferably dihydric and, optionally, also trihydric, alcohols with polybasic, preferably dibasic, carboxylic acids. Instead of using the free polycarboxylic acids, it is also possible to use the corresponding polycarboxylic acid anhydrides or corresponding polycarboxylic acid esters of lower alcohols or mixtures thereof for producing the polyesters. The polycarboxylic acids may be aliphatic, cycloaliphatic, aromatic and/or heterocyclic and may optionally be substituted, for example by halogen atoms, and/or may be unsaturated.

Examples of such polycarboxylic acids include: succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids, such as oleic acid, optionally in admixture with monomeric fatty acids, terephthalic acid dimethyl ester and terephthalic acid-bisglycol ester. Suitable polyhydric alcohols are for example, ethylene glycol, 1,2- and 1,3-propylene glycol, 1,4- and 2,3-butylene glycol, 1,6-hexane diol, 1,8-octane diol, neopentyl glycol, cyclohexane dimethanol (1,4-bis-hydroxymethyl-cyclohexane), 2-methyl-1,3-propane diol, also diethylene glycol, triethylene glycol, tetraethylene glycol, polyethylene glycols, dipropylene glycol, polypropylene glycols, dibutylene glycol and polybutylene glycols. Small quantities of higher polyhydric alcohols, such as glycerol, trimethyl propane, etc., are used for introducing a low degree of branching. The polyesters may contain terminal carboxyl groups. Polyesters of lactones, for example ε-caprolactone, or hydroxy carboxylic acids, for example ω-hydroxy caproic acid, may also be used.

Suitable polyacetals are, for example, the compounds obtainable from the reaction of glycols, such as diethylene glycol, triethylene glycol, 4,4'-dioxethoxy diphenyl dimethyl methane and hexane diol, with formaldehyde. Polyacetals suitable for use in accordance with the present invention may also be obtained by the polymerization of cyclic acetals.

Suitable polycarbonates containing hydroxyl groups are known and may be obtained, for example, by reacting diols, such as 1,3-propane diol, 1,4-butane diol and/or 1,6-hexane diol, diethylene glycol, triethylene glycol or tetraethylene glycol, with diaryl carbonates, for example diphenyl carbonate, or with phosgene.

The polyester amides and polyamides include, for example, the predominantly linear condensates obtained from polybasic saturated and unsaturated carboxylic acids or the anhydrides thereof and polyfunctional saturated and unsaturated amino-alcohols, diamines, polyamines and mixtures thereof.

Representatives of these compounds which may be used in accordance with the present invention are described, for example, in High Polymers, Vol. XVI, "Polyurethanes, Chemistry and Technology", by Saunders-Frisch, Interscience Publishers, New York, London, Vol. I, 1962, pages 44 to 54, and Vol II, 1964, pages 5–6 and 198–199, and in Kunststoff-Handbuch, Vol. VII, Vieweg-Höchtlen, Carl-Hanser-Verlag, Munich, 1966, for example on pages 45–71.

It is, of course, also possible to use mixtures of the above-mentioned polyols. According to the present invention, it is preferred to use polyester diols based on ethylene glycol, propylene glycol, 1,4-butane diol, 1,6-hexane diol and/or neopentyl glycol and adipic acid, optionally aromatic dicarboxylic acids, such as phthalic acid, isophthalic acid and terephthalic acid, and/or olefinically unsaturated dicarboxylic acids, such as maleic acid, itaconic acid or fumaric acid. The polyesters are normally produced using an excess of the diol component so that the chain ends contain hydroxyl groups. In order to optimize the properties of the end product, it may be necessary to use a combination of several polyester diols. Reference has been made to the significance of using aromatic polyesters for adjusting the refractive index and for improving weather resistance. It is also possible, to a certain extent, to use branched polyesters produced not only from difunctional components, but also from more highly functional branching agents, best triols, such as glycerol or trimethylol propane. However, the proportion in which these branched polyesters are used should be kept so small that a polyurethane which is homogeneously soluble in the monomer, rather than a cross-linked polyurethane gel, is formed, which may be determined by a simple preliminary test.

Low molecular weight diols which may optionally be used are, for example, the compounds referred to above as starting components for the production of the polyesters.

It has been found that glasses having high stability to light may be obtained in accordance with the present invention by using a diisocyanate having a branched aliphatic carbon skeleton of from about 7 to 36 carbon atoms or a basic alicyclic skeleton containing from about 5 to 25 carbon atoms. Suitable aliphatic diisocyanates are, for example, 2,2,4- or 2,4,4-trimethylhexamethylene diisocyanate or technical mixtures thereof, diisocyanates derived from esters of lysine or diisocyanates based on dimerized fatty acids which are produced in known manner by converting dicarboxylic acids containing up to 36 carbon atoms into the corresponding diamines, followed by phosgenation. Suitable alicyclic diisocyanates are, for example, 1,3-cyclobutane diisocyanate 1,3- and 1,4-cyclohexane diisocyanate, 1-isocyanato-3,3,5-trimethyl-5-isocyanatomethyl cyclohexane (isophorone diisocyanate), 2,4- and/or 2,6-diisocyanato-1-methyl cyclohexane or 4,4'-diisocyanatodicyclohexyl methane in the form of the pure geometric isomers or the isomer mixtures. According to the present invention, it is particularly preferred to use isophorone diisocyanate. Preadducts of the above-mentioned diisocyanates with the above-mentioned low molecular weight diols may also be used.

Other suitable diisocyanates are obtained by the radical graft copolymerization of aliphatic or cycloaliphatic diisocyanates with one or more of the vinyl monomers described below, preferably methyl methacrylate, in quantities of from about 10 to 100%, by weight, preferably from about 20 to 75%, by weight based on the diisocyanate used. As a result of this pretreatment, the hexamethylene diisocyanate which, as such, is unsuitable for the process according to the present invention may also be converted into a suitable isocyanate which gives clear polyurethane solutions. These modified polyisocyanates may be obtained by mixing the diisocyanate, the vinyl monomer and optionally an inert solvent and initiating radical polymerization in a manner known per se e.g. by adding an initiator. Processes of this kind are described e.g. in British Pat. No. 1,354,783, in U.S. patent application Ser. Nos. 277,804 and 765,172 and in U.S. Pat. Nos. 3,654;106 and 3,943,159, herein incorporated by reference.

Diamines suitable for use in accordance with the present invention are alkylene diamines containing from 2 to 36 carbon atoms, for example hexamethylene diamine, undecamethylene diamine, 2,2,4- and/or 2,4,4-trimethyl hexamethylene diamine or diamines derived from dimeric fatty acids, also cyclic aliphatic diamines containing from 5 to 25 carbon atoms, for example the various diaminocyclohexanes, diaminomethyl cyclohexanes and diaminodicyclohexyl methanes in the form of the pure position and geometric isomers or isomer mixtures, bis-aminomethyl cyclohexanes and 1-amino-3,3,5-trimethyl-5-aminomethyl cyclohexane (isophorone diamine). The preferred diamine is isophorone diamine whose use in combination with isophorone diisocyanate or aliphatic or alicyclic diisocyanates modified by graft polymerization leads to the formation of completely clear elastomer solutions in methyl methacrylate.

In order to avoid an excessive increase in viscosity during preparation of the elastomer solution, which would complicate processing, the isocyanate component (2) and the sum of components (1) and (3) containing active hydrogen are not used in an equimolar ratio, but instead in a molar ratio which, on completion of the reaction, gives a polyurethane urea containing residual NCO-groups. The unreacted isocyanate groups of the polyurethane urea may be closed by means of an excess of diamine or by means of a monofunctional NCO-reactive compound. For this purpose, it is possible to use, for example, aliphatic alcohols, such as methanol, ethanol, octanol, sec.-butanol stearyl alcohol, etc., or aliphatic monoamines, for example n-butylamine, stearylamine, di-n-butylamine, cyclohexylamine, etc. In addition, polymerizable groups may be introduced by means of the residual NCO-groups by reacting them with a compound containing an olefinic double bond and having monofunctional reactivity to isocyanates. Such compounds are, for example, the hydroxy alkyl esters of acrylic acid or methacrylic acid, such as β-hydroxyethyl methacrylate. The elastomer phase may be linked to the thermoplast phase through the thus introduced polymerizable double bonds.

The polyurethane urea elastomer is synthesized in the monomeric methacrylic ester by a two-stage or prepolymer process, in which the relatively high molecular weight polyol component is initially reacted with a polyisocyanate to form a prepolymer containing NCO-groups, after which the high molecular weight polyurethane urea is synthesized by adding the chain-extender. After the required molecular weight has been reached, the reaction may be stopped by the addition of a monofunctional chain-terminator.

The prepolymer is preferably produced by reacting the selected polyol(s) under anhydrous conditions and after dehydration in vacuo with a calculated excess of the diisocyanate and following the progress of the reaction by titrimetric determination of the NCO-content. Normally, there is no need to add catalysts. In the interests of acceleration, however, the conventional polyurethane catalysts, particularly organo-tin compounds, such as tin dioctoate or di-n-butyl tin dilaurate, may be added in small quantities, for example from 0.0005 to 0.5%, based on the quantity of the reaction mixture. The reaction is over when the NCO-concentration has reached the value calculated beforehand from the molar ratio of the starting materials. The reaction temperature is limited at the lower end of the range by the consistency of the reactants used, above all the polyester diol which is generally highly viscous to wax-like or resin-like to solid at room temperature, so that a reaction temperature of at least about 50° to 60° C. is preferably applied in the interests of thorough admixture. At the upper end of the range, the reaction temperature is limited by the possibility of undesirable secondary reactions which increase in extent with increasing temperature and may lead to losses of isocyanates and to cross-linking reactions and also to the formation of clouded or colored products. It is not advisable significantly to exceed a reaction temperature of about 120° C. A particularly preferred range for the reaction temperature is from about 80 to 110° C. It is, of course, also possible directly to prepare the prepolymer in the monomer, although the concentrations of the inter-reacting groups are reduced in this way, the reaction thereby slowing down.

The highly viscous melt of the prepolymer is best taken up in an organic solvent for further processing. The organic solvent preferably used for this purpose is the monomer which, in order to inhibit premature polymerization, should preferably be stabilized by the addition of a standard inhibitor, such as hydroquinone, hydroquinone monomethyl ether or phenothiazine.

The necessary quantity of chain-extender may be calculated from the NCO-number of the prepolymer in accordance with the following equation:

$$W_D = \frac{\text{NCO-number} \times W_P}{100 \times 84} \times M_D \times \frac{\alpha}{100}$$

wherein
$W_D$: quantity of diamine to be used (in g)
$W_P$: quantity of the prepolymer (in g)
$M_D$: molecular weight of the diamine
$\alpha$: degree of extension
NCO-number: %, by weight, of NCO.
The degree of extension is defined as the percentage quantity of chain-extender used based on the amount of chain extender equivalent to the NCO-content. The degree of extension applied in practice is selected in such a way that the viscosity of a 20% solution of the elastomer in the monomer assumes a value of from about 200 to 30 000 cP, as measured at 20° C.

As mentioned above, the prepolymer is dissolved in the vinyl monomer selected either at room temperature or at moderately elevated temperature before the chain-extending reaction. The chain-extender is then added continuously or in portions and the increase in the viscosity of the solution is followed. The extending reaction takes place smoothly at sufficient velocity at temperatures as low as room temperature, although in the interests of acceleration it may also be carried out at moderately elevated temperatures, for example up to 40° C. In the interests of better admixture during introduction and hence better control of the reaction, the chain-extender is preferably also dissolved in the vinyl monomer used. The quantity of the vinyl monomer used as solvent is selected in such a way that the solids content of the end product does not fall below the required limit. Once the required end viscosity or rather the preselected degree of extension has been reached and a residual NCO-content may still be detected, the reaction is stopped. This is done by reacting the residual NCO-groups with the monofunctional chain-terminator, of which the necessary quantity may be calculated in accordance with the following formula:

$$W_T = \frac{\text{NCO-number} \times W_P}{100 \times 84} \times \frac{100 - \alpha}{100} \times M_T$$

wherein:
$W_T$: quantity of chain-terminator (in g)
$M_T$: molecular weight of the chain-terminator.
Due to inevitable side reactions, in practice part of the NCO-groups of the prepolymer are consumed by reactions other than chain extension so that NCO-free polyurethane ureas are obtained even if a subequivalent amount of chain extending agent is used. In cases, where the elastomer still contains free NCO-groups, however, after the desired viscosity (or degree of extension) has been reached, these residual NCO-groups may be removed, as explained above, by adding a monofunctional compound or a further portion of diamine in excess to the residual NCO-content.

Unless the reaction by which the prepolymer is formed has already been catalyzed, a conventional catalyst, for example an organo-tin compound, such as di-n-butyl tin dilaurate, may optionally be added in a small quantity, for example from 0.0005 to 0.5%, based on the solids content of the solution, in order to accelerate chain-termination. The reaction may also be carried out at room temperature or at moderately elevated temperature. The final elastomer solution may be stored for prolonged periods under the conventional precautionary measures, such as cooling and saturation with atmospheric oxygen, optionally in the presence of standard commercial-grade phenolic or aminic stabilizers, until it is required for processing.

The polymerizable monomer or monomer mixture consists predominantly of esters of methacrylic acid, the principal monomer, generally methyl methacrylate, best being used as solvent during production of the polyurethane.

Just as in the production of unmodified polymethylmethacrylate, additions of from about 0 to 20 mol % of other (meth)acrylic acid esters are possible in order to produce materials having the required properties. For example, acrylic and methacrylic acid esters of $C_4$–$C_8$ alcohols may improve the processing properties of the polymer, whereas short-chain acrylates, such as methyl or ethyl acrylate, increase thermal stability. In order to improve phase compatibility (for example by the development of hydrogen bridge bonds), it may be advantageous to add unsaturated acids, such as acrylic or methacrylic acids or the nitriles thereof or hydroxyalkyl(meth)acrylates, such as β-hydroxyethyl methacrylate.

Monomers having a high refractive index, such as styrene and its derivatives, and also phenyl or benzyl(meth) acrylate, may be used for matching the refractive index of the hard phase with the polyurethane phase.

According to the present invention, the following quantities are generally used:

(a) from about 80 to 100 mol %, preferably from about 90 to 100 mol %, (based on the total quantity of polymerizable monomers) of methyl methacrylate;

(b) from about 0 to 20 mol %, preferably from about 0 to 10 mol %, of other esters of acrylic and/or methacrylic acids;

(c) from about 0 to 20 mol %, preferably from about 0 to 10 mol %, of acrylic acid and/or methacrylic acid; and (d) from about 0 to 20 mol %, preferably from about 0 to 10 mol %, of other olefinically unsaturated monomers.

By using molecular weight regulators, such as alkyl mercaptans or esters of thioglycolic or thiopropionic acid, it is also possible to improve the processibility of the polymer and to increase its thermal stability by the reduction in molecular weight. On the other hand, it may be necessary, in order to prevent corrosion and solubility, to add cross-linking agents, for example glycol dimethacrylate, allyl or vinyl(meth)acrylate, triallyl cyanurate, etc., which leads to products having good properties, above all in the event of modification with small quantities of polyurethane urea. It is also possible to add agents which suppress gel effects, such as terpinols (German Pat. No. 1,795,395), UV- and heat-stabilizers, plasticizers, coupling agents and release agents, etc.

In order to produce high-impact, rigid acrylic glass, elastomer solutions having PUR-contents of from about 10 to 25%, by weight, are generally used. Higher PUR-contents within the claimed range lead to soft, flexible products on completion of polymerization.

Polymerization of the unsaturated monomers is carried out radically in known manner in the presence of peroxides or azo compounds which have suitable decomposition rates at the polymerization temperature selected, although photochemical polymerization by UV-rays or other high-energy rays, optionally in the presence of photoinitiators, is also possible.

The polymerization reaction is preferably carried out in known manner between two plates of glass and an elastic sealing cord encircling them at the edges thereof. This process is described, inter alia, in U.S. Pat. No. 2,091,615, incorporated herein by reference.

In addition, however, other polymerization processes known from the production of acrylic glass, such as polymerization between two endless steel belts (U.S. Pat. No. 3,371,383, incorporated herein by reference), may also be used.

The polyurethane-modified methacrylate-based plastics produced in accordance with the present invention represent an enrichment of the art, in particular when, as mentioned above, the polymerization reaction is carried out in a mold, for example between glass plates or steel belts.

The process according to the present invention is illustrated by the following Examples. (Unless otherwise indicated, the quantities quoted represent parts, by weight, or percent, by weight).

The following abbreviations are used for the various starting materials in the following Examples:

Polyester A: Linear polyester diol of adipic acid, 1,6-hexane diol and neopentyl glycol having an OH-number of 66 and an average molecular weight of 1700.
Glass transition temperature: −60° C.

Polyester B: A linear polyester diol of adipic acid, phthalic acid anhydride and ethylene glycol having an OH-number of 64 and an average molecular weight of 1750.
Molar ratio of the dicarboxylic acids: 1:1
Glass transition temperature: −20° C.

Polyester C: A linear polyester diol of adipic acid and 1,6-hexane diol having an OH-number of 134 and an average molecular weight of 835.
Glass transition temperature: −30° C.

Polyester D: A linear polyester diol similar to polyester A having an OH-number of 55 and an average molecular weight of 2000.
Glass transition temperature: −60° C.

Polyester E: A linear, unsaturated polyester diol of phthalic acid anhydride, maleic acid anhydride and 1,2-propylene glycol having an average molecular weight of 2000.
Molar ratio of the acid components: 1.08:1.
Glass transition temperature: +32° C.

IPDI: 3-isocyanatomethyl-3,5,5-trimethyl cyclohexylisocyanate (isophorone diisocyanate).

IPDA: 3-aminomethyl-3,5,5-trimethyl cyclohexylamine (isophorone diamine).

Solution viscosity was measured by means of a Haake Viskotester VT 02, bell number 1.

Production of the polyurethane urea solutions:

Solution 1

1680 g (2 mols) of polyester C are dehydrated in a water jet vacuum at 110° C. 666 g (3 mols) of IPDI are then added at 100° C. After heating for 2 hours to 100° C., an NCO-group content of 3.6% is determined. 2000 g of this product are dissolved in 8000 g of monomeric methyl methacrylate. An NCO-group content of 0.59 is determined in the solution. 111 g (0.654 mol) of isophorone diamine, divided into 3 portions, are then introduced at room temperature. This corresponds to 92.5% of the quantity equivalent to the NCO-content. An increase in viscosity is observed. Finally, 10 ml of methanol are added to react off residual NCO-groups. The solution has a viscosity at room temperature of 5500 cP, as measured using a Haake Viskotester, and a refractive index $n_D^{20}$ of 1.4925.

Solution 2

A prepolymer having an NCO-content of 2.81% is prepared from 2.1 mols of polyester C and 3 mols of IPDI in the same way as described in Example 1. 850 g of this prepolymer are reacted for 3 hours at 100° C. with 17 g (0.189 mol) of 1,4-butane diol, after which the NCO-content has fallen to 0.71%. This viscous melt is dissolved in methyl methacrylate (solids content 30%), followed by the addition of 10.0 g (0.059 mol) of IPDA. A highly viscous solution is formed which is diluted to 20% with more methyl methacrylate. 2 g of di-n-butylamine are added to close the remaining NCO-groups. The solution has a viscosity of 2650 cP at room temperature.

Solution 3

A polyurethane urea solution is prepared in the same way as described in Example 2, starting with 1313 g of a prepolymer of 1.05 mol of polyester D and 1.5 mol of IPDI which has an NCO-content of 1.5%. The initial chain-extending reaction is carried out using 10.5 g (0.117 mol) of 1,4-butane diol in the melt at 100° C. The prepolymer is dissolved in methyl methacrylate to form a 30% solution which is reacted with 14 g of IPDA (0.082 mol). The resulting highly viscous solution is diluted to a solids content of 20% and then stirred for 1 hour with 4 g of di-n-butylamine (0.031 mol). The fully reacted solution has a viscosity at room temperature of 1000 cP.

Solution 4

1050 g of a prepolymer which has been produced by reacting 1.2 mols of polyester A and 0.2 mol of polyester B with 2 mols of IPDI and which has an NCO-content of 2.0% are taken up in 1575 g of methyl methacrylate. 30.6 g of IPDA are initially added to the resulting solution. During the chain-extending reaction, the viscosity of the solution rises steeply so that the solution is diluted to a solids content of 20% using 2625 g of methyl methacrylate, after which another 3.4 g of IPDA are added. The total quantity of IPDA corresponds to 0.2 mol. No more NCO-groups may be detected in the solution. The solution has a final viscosity of 3400 cP at 20° C.

Solution 5

1160 g (2 equivalents) of a graft polymer which has been produced by the radical polymerization of 30 parts of methyl methacrylate in the presence of 100 parts of polyester A with azoisobutyronitrile as initiator and which has an OH-number of 95 are reacted with 333 g (1.5 mols)of IPDI to form an NCO-prepolymer having an NCO-content of 2.4%. This prepolymer is subjected to initial chain-extension using 22.5 g (0.25 mol) of 1,4-butane diol and the product is dissolved in 3535 g of methyl methacrylate. The resulting solution has an NCO-group content of 0.23%. For further chain-extension, 21.3 g (0.125 mol) of IPDA are then added to the mixture, corresponding to 80% of the quantity of isocyanate present in the solution. After a short time, the viscosity of the solution rises steeply so that the solution is diluted to a solids content of 20% using another 2550 g of methyl methacrylate. Following the addition of 1 g of IPDA (0.006 mol), a further increase in viscosity is observed. The final viscosity is measured at 650 cP/20° C. and the refractive index $n_D^{20}$ at 1.4912.

Solution 6

595 g (0.35 mol) of polyester A and 131 g (0.15 mol) of polyester B are dehydrated in vacuo for 30 minutes at 110° C. 166.5 g (0.75 mol) of IPDI are added to the melt at 100° C., followed by stirring for 2 hours at that temperature. The product is then left standing for another 20 hours at room temperature. Thereafter, the NCO-group content amounts to 1.89%. The prepolymer is dissolved in 3900 g of methyl methacrylate at 40° C. 90% of the equivalent quantity of 38.2 g (0.224 mol) of IPDA, dissolved in 196 g of methyl methacrylate, are added in portions to the resulting solution. Thereafter, the viscosity of the solution has increased to 21,000 cP and the reaction is stopped by the addition of 6 g of β-hydroxyethyl methacrylate and 0.5 g of dibutyl tin dilaurate dissolved in 20 g of methyl methacrylate. The water-clear, colorless solution has a refractive index of 1.4928.

Solution 7

A prepolymer having an NCO-content of 2.03% is prepared in the same way as described in Example 6 using 0.1 g of dibutyl tin dilaurate. Further processing is also carried out in the same way as described in Example 6, except that the chain-extending reaction is stopped after only 80% of the calculated quantity of amine has been added. The product has a viscosity of 3800 cP.

Solution 8

A mixture of 382 g (0.225 mol) of polyester A and 50 g (0.025 mol) of polyester E is reacted without preliminary dehydration with 83.3 g (0.375 mol) of IPDI to form a prepolymer having an NCO-content of 1.85%. The product is taken up in 1885 g of methyl methacrylate and a solution of 17.4 g of IPDA in 85 g of methyl methacrylate is added dropwise at room temperature. After 90% of the amine solution has been added dropwise, the viscosity reaches a value of 2800 cP. The reaction is stopped by the addition of 1.95 g of β-hydroxyethyl methacrylate and 1 g of dibutyl tin dilaurate dissolved in a little methyl methacrylate. The solids content amounts to 20% and the viscosity to 2800 cP.

Solution 9

The procedure is as in Example 8, except that the chain-extending reaction is carried out at 35° C. The solution obtained has a viscosity of 3400 cP at 20° C.

Solution 10

The procedure is as in Example 8, except that the starting prepolymer has an NCO-content of 2.07%. A polyurethane urea solution in methyl methacrylate having a solids content of 20%, a viscosity of 2400 cP/20° C. and a refractive index of 1.4862 is obtained.

Solution 11

A mixture of 305 g (0.175 mol) of polyester A and 127.5 g (0.075 mol) of polyester B is reacted without preliminary dehydration with 78.2 g (0.75 equivalent) of a graft polymer which has been produced by the radically initiated polymerization of 20 parts of methyl methacrylate in 80 parts of hexamethylene diisocyanate with 0.1 part of azoisobutyronitrile as initiator and which has an NCO-content of 40.5%, corresponding to an NCO-equivalent weight of 107. The reaction is continued at 100° C. until an NCO-content of 1.92% is reached. The prepolymer is taken up in 2040 g of methyl methacrylate. The equivalent quantity of IPDA calculated from the NCO-number, namely 19.85 g, is dissolved in methyl methacrylate to form a solution having a total volume of 100 ml. The solution is added dropwise with stirring at room temperature to the prepolymer solution. After 90% of the solution has been added, a viscosity of 4200 cP is reached and the chain-extending reaction is terminated. The remaining NCO-groups are closed by the addition of 1.5 g of methanol. The product is completely clear and colorless.

Solution 12

A prepolymer is prepared in the same way as described in Example 11, starting from a graft polymer having an NCO-content of 39.5% produced in the same way with tert.-butyl peroctoate as polymerization initiator. The prepolymer has an NCO-content of 2.1%. This corresponds to an IPDA demand of 21.5 g. The chain-extending reaction is carried out at 40° C. in the same way as described in Example 11, except that it is stopped after only 80% of the diamine solution has been added and the residual NCO-content is reacted with 3 g of β-hydroxyethyl methacrylate. The solution has a final viscosity at room temperature of 3100 cP.

EXAMPLES

Example 1

Following the addition of 0.2 part, by weight, of t-butyl-perpivalate, an elastomer solution consisting of 96 parts, by weight, of polyurethane urea solution 6 and 4 parts, by weight, of styrene is briefly evacuated in order to remove dissolved gases, introduced into a chamber consisting of two plates of glass and an elastic spacing and sealing cord encircling them at the edges thereof and polymerized in this chamber in a water bath at 50° C. for 15 hours. Polymerization is completed in a drying cabinet over a period of 2 hours at 110° C.

Test specimens are cut from the resulting clear, colorless 4 mm acrylic glass plate for measuring impact and notched impact strength in accordance with DIN 53 453 and the Vicat softening temperature in accordance with DIN 54 460.

Testing in comparison with unmodified acrylic glass (values in brackets) gives the following mechanical properties:
 Impact strength: 94 (12) mmN/mm$^2$
 Notched impact strength: 8 ( 2) mmN/mm$^2$
 Vicat softening temperature: 91 (112)° C.

Example 2

Polyurethane urea solution 10 is polymerized by the polymerization process described in Example 1 in the presence of 0.2%, by weight, of dilauroyl peroxide as initiator.

The following properties are measured on the colorless clear plate:
 Impact strength: 107 mmN/mm$^2$
 Notched impact strength: 8 mmN/mm$^2$
 Vicat softening temperature: 89° C.

Example 3

An elastomer solution of 97 parts, by weight, of polyurethane urea solution 11 and 3 parts, by weight, of benzyl methacrylate is polymerized with 0.15%, by weight, of azoisobutyronitrile by the process described in Example 1 and tested. The resulting plate has the following properties:
 Impact strength: no breakage
 Notched impact strength: 10 mmN/mm$^2$
 Vicat softening temperature: 81° C.

Example 4

The following elastomer solution is polymerized in accordance with Example 1 and the colorless, clear acrylic glass plate obtained tested in the same way:
97 parts, by weight, of polyurethane urea solution 12
3 parts, by weight, of styrene
 Impact strength: no breakage
 Notched impact strength: 9 mmN/mm$^2$
 Vicat softening temperature: 95° C.

Examples 5 to 7

In order to test the effect of the PUR-content upon the properties of acrylic glass plates, solution 1 is adjusted by the addition of styrene and, optionally, by dilution with methyl methacrylate to solids contents of 10, 15 and 20% by weight, and to a ratio, by weight, of methyl methacrylate to styrene of 97.8:2.2. The solution is polymerized in accordance with Example 1.

| PUR-content %, by weight | Vicat softening temperature °C. | Impact strength at 23° C. (mmN/mm$^2$)−20° C. | | Notched impact strength at 23° C. (mmN/mm$^2$)−20° C. | |
| --- | --- | --- | --- | --- | --- |
| 10 | 105 | 48 | 13 | 4.0 | 2.1 |
| 15 | 99 | 75 | 15 | 5.3 | 2.3 |
| 20 | 91 | no breakage | 33 | 10 | 3.0 |

Example 8

A hemi-spherical dome 200 mm in diameter is deep drawn at 160° C. from a 6 mm acrylic glass plate produced in accordance with Example 1 in order to test the thermoelastic shaping properties.

Re-formability is good and the optical quality of the dome is satisfactory.

The orientation present at the zenith of the dome corresponds to that of a flat, 45% biaxially stretched plate on which the following values were determined:
 Impact strength: no breakage
 Notched impact strength: 52 mmN/mm$^2$ This means that a considerable increase in toughness in relation to the measured values of Example is obtained by the biaxial stretching.

Example 9

An elastomer solution of 97.2 parts, by weight, of polyurethane urea solution 2 and 2.8 parts, by weight, of styrene is polymerized as in Example 1 in the presence of 0.2 parts, by weight, of t-butyl perpivalate, 0.4 part, by weight, of a UV-stabilizer (Tinuvin ® 327, a product of Ciba-Geigy), 0.6 part, by weight, of an oxidation stabilizer (Irganox ® 101, a product of Ciba-Geigy) and 0.25 part, by weight, of a hydrolysis stabilizer (Stabaxol ® I, a product of Bayer AG), and the resulting acrylic glass plate was weathered in the open for 2 years.

After this weathering period, the plate, which was originally glass clear, is slightly clouded and its notched impact strength has fallen from 10 to 9 mmN/mm$^2$, i.e. only slightly.

Example 10

Polyurethane urea solution 4 is concentrated by distilling off part of the monomer. By adding methyl methacrylate and different quantities of methyl acrylate, the solids content is adjusted to 20%, by weight, and the ratio, by weight, of methyl methacrylate (MMA) to methyl acrylate (MA) to the values shown in the following Table. The solutions are polymerized in accordance with Example 1 and the resulting colorless acrylic glass plates tested in the same way:

| Example No. | MMA/MA | Vicat softening temperature (°C.) | IS | NIS | Clarity |
| --- | --- | --- | --- | --- | --- |
|  | 100/0 | 89 | no breakage | 12 | clouded |
|  | 90/10 | 85 | no break- | 11 | slight clouding |

-continued

| Example No. | MMA/MA | Vicat softening temperature (°C.) | IS | NIS | Clarity |
|---|---|---|---|---|---|
| 10 | 85/15 | 82 | no breakage | 12 | clear |
|  | 80/20 | 80 | no breakage | 12 | slight clouding |

IS = impact strength
NIS = notched impact strength (mmN/mm$^2$)

Example 11

The polyurethane urea solution (solution 4) used in Example 10 is polymerized in the presence of 1% of glycol dimethacrylate.

The acrylic glass plate obtained is insoluble in organic solvents and its thermoelastic shaping properties are substantially unchanged.

Notched impact strength: 8 mmN/mm$^2$

Vicat softening temperature: 105° C.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. A process for the production of optically clear high-impact polymer alloys by the radically initiated polymerization of homogeneous mixtures of:
 (A) from about 40 to 92%, by weight, of one or more monomeric esters of methacrylic acid and, optionally, small quantities of one or more copolymerizable vinyl monomers wherein from about 80–100 mol %, based on the total quantities of polymerizable monomers, of one or more monomeric esters of methacrylic acid and from about 0–20 mol %, based on the total quantity of polymerizable monmers, of one or more copolymerizable vinyl monomers are employed; and
 (B) from about 8 to 60 parts of a substantially linear polyurethane urea elastomer; wherein the polyurethane urea elastomer is initially synthesized by polyaddition from:
  (1) one or more substantially linear polyester, polyester amide, polyacetal or polycarbonate Polyols having a molecular weight of from about 500 to 6000 and, optionally, from about 0 to 20 mol %, based on the total polyol component, of diols having a molecular weight of from about 62 to 500;
  (2) a polyisocyanate selected from the group consisting of isophorone diisocyanate, 4, 4'-dicyclohexyl methane diisocyanate and graft polymerization products of an aliphatic or cycloaliphatic diisocyanate and 10 to 100 parts by weight of a vinyl monomer per 100 parts of diisocyanate;
  (3) one or more aliphatic or cycloaliphatic diamines; and, optionally,
  (4) a saturated or olefinically unsaturated compound having monofunctional reactivity towards isocyanates;

by preparing a prepolymer containing from about 1 to 5%, by weight, of NCO groups from component (1) and (2) in a first stage, reacting the prepolymer dissolved in the polymerizable monomeric ester of methacrylic acid in a second stage with component (3) in an isocyanate:amino-equivalent ratio of between about 1.01:1 and 1.5:1, optionally in the presence of more copolymerizable vinyl monomers, until an about 20% solution of polyurethane urea in the monomer would have a viscosity of from about 200 to 30,000 cP at 20° C., optionally reacting any free NCO groups still present in a third reaction stage by adding component (4), adjusting the solids content of the solution to from about 8 to 60%, by weight, optionally by adding more vinyl monmers, and finally subjecting the mixture to radically initiated polymerization in known manner, optionally in molds.

2. A process as claimed in claim 1, wherein a polyester of adipic acid and one or more aliphatic diols, optionally in combination with up to about 30 mol % of a polyester of phthalic acid, isophthalic acid or terephthalic acid, or a mixed polyester of corresponding composition is used as component (1).

3. A process as claimed in claim 2, wherein the polyester component used additionally contains a polyester diol containing polymerizable double bonds based on maleic acid, fumaric acid or itaconic acid or consists of a mixed polyester or a combination of mixed polyesters having a corresponding gross composition.

4. A process as claimed in claims 1, 2 or 3, wherein a hexamethylene diisocyanate, 2,2,4- and/or 2,4,4-trimethyl hexamethylene diisocyanate, cyclohexane diisocyanate, methyl cyclohexane diisocyanate, bicyclohexyl methane diisocyanate or isophorone diisocyanate modified by graft copolymerization with from about 10 to 100%, by weight, based on diisocyanate, of one or more vinyl monomers is used as the diisocyanate.

5. A process as claimed in claims 1, 2 or 3, wherein isophorone diamine is used as chain-extender.

6. A process as claimed in claims 1, 2 or 3, wherein a compound free from olefinically unsaturated groups and having monofunctional reactivity towards isocyanates is used as the chain-terminator.

7. A process as claimed in claim 6, wherein an alcohol or a primary or secondary alkylamine is used as chain-terminator.

8. A process as claimed in claims 1, 2 or 3, wherein a compound containing an olefinic double bond in the molecule and having monofunctional reactivity towards isocyanates is used as chain-terminator.

9. A process as claimed in claim 8, wherein the chain terminator is selected from the group consisting of an olefinically unsaturated alcohol, an olefinically unsaturated primary or secondary aliphatic amine and a hydroxyl ester of an α, β-unsaturated carboxylic acid.

10. The product of the process of claim 6.

11. A radically polymerizable optically clear composition comprising homogeneous mixtures of:
 (A) from about 40 to 92%, by weight, of one or more monomeric esters of methacrylic acid and, optionally, small quantities of one or more copolymerizable vinyl monomers wherein from about 80–100 mol %, based on the total quantities of polymerizable monomers, of one or more monomeric esters of methacrylic acid and from about 0–20 mol %, based on the total quantity of polymerizable monomers, of one or more copolymerizable vinyl monomers are employed; and
 (B) from about 8 to 60 parts of a substantially linear polyurethane urea elastomer; wherein the polyurethane elastomer is initially synthesized by polyaddition from:
  (1) one or more substantially linear polyester, polyester amide, polyacetal or polycarbonate polyols having a molecular weight of from about 500 to 6000 and, optionally, from about 0 to 20 mol %, based on the total polyol component, of diols having a molecular weight of from about 62 to 500;

(2) a polyisocyanate selected from the group consisting of isophorone diisocyanate, 4,4'-dicyclohexyl methane diisocyanate and graft polymerization products of an aliphatic or cycloaliphatic diisocyanate and 10 to 100 parts by weight of a vinyl monomer per 100 parts of diisocyanate;

(3) one or more aliphatic or cycloaliphatic diamines; and, optionally, (4) a saturated compound having monofunctional reactivity towards isocyanates;

by preparing a prepolymer containing from about 1 to 5%, by weight, of NCO-groups from component (1) and (2) in a first stage, reacting the prepolymer dissolved in the polymerizable monomeric ester of methacrylic acid in a second stage with component (3) in an isocyanate:amine equivalent ratio of between about 1.01:1 and 1.5:1, optionally in the presence of more copolymerizable vinyl monomers, until an about 20% solution of polyurethane area in the monomer would have a viscosity of from about 200 to 30,000 cP at 20° C., optionally reacting any free NCO-groups still present in a third reaction stage by adding component (4), and adjusting the solids content of the solution to from about 8 to 60%, by weight, optionally by adding more vinyl monmers.

12. A process for the production of radically polymerizable optically clear compositions comprising chain-extending in isocyanate terminated polyurethane prepolymer dissolved in about 40 to 92 wt. % of vinyl monomers being substantially monomeric esters of methacrylic acid wherein (A) the prepolymer has a free NCO content of between about 1 and 5 wt. % and is synthesized from (1) one or more substantially linear polyester, polyester amide, polyacetal or polycarbonate polyols having a molecular weight of from about 500 to 6000 and, optionally, from about 0 to 20 mol %, based on the total polyol component, of diols having a molecular weight of from about 62 to 500; and (2) a polyisocyanate selected from the group consisting of isophorone diisocyanate, 4,4'-dicyclohexyl methane diisocyanate and graft polymerization products of an aliphatic or cycloaliphatic diisocyanate and 10 to 100 parts by weight of a vinyl monomer per 100 parts of diisocyanate; and (b) The chain extension is effected with aliphatic or cycloaliphatic diamines at an isocyanate to amino equivalent ratio of between about 1.01:1 and 1.5:1.

13. The composition of claim 11 wherein the polyol is a polyester diol based on:

(A) 50 to 100 mol %, of optionally olefinically unsaturated aliphatic dicarboxylic acids; and (B) from 0 to 50 mol %, of cycloaliphatic and/or aromatic dicarboxylic acids, with reference to the acid component of the polyester, having a molecular weight of from about 600 to 4000 and having a glass transition temperature of at most about −20° C.

14. The composition of claim 13 wherein the acid component of the polyester is derived from:

(A) between about 65 and 95 mol % aliphatic dicarboxylic acid, and (B) between about 5 and 35 mol % cycloaliphatic and aromatic dicarboxylic acid.

15. A process for the production of optically clear high-impact polymer alloys by the radically initiated polymerization of homogeneous mixtures of:

(A) from about 40 to 92%, by weight, of one or more monomeric esters of methacrylic acid and, optionally, small quantities of one or more copolymerizable vinyl monomers wherein from about 80–100 mol %, based on the total quantities of polymerizable monomers, of one or more monomeric esters of methacrylic acid and from about 0–20 mol %, based on the total quantity of polymerizable monomers, of one or more copolymerizable vinyl monomers are employed; and (B) from about 8 to 60 parts of a substantially linear polyurethane urea elastomer; wherein the polyurethane urea elastomer is initially synthesized by polyaddition from:

(1) one or more substantially linear polyester, polyester amide, polyacetal or polycarbonate polyols having a molecular weight of from about 500 to 6000 and, optionally, from about 0 to 20 mol %, based on the total polyol component, of diols having a molecular weight of from about 62 to 500;

(2) a polyisocyanate comprising graft polymerization products of an aliphatic or cycloaliphatic diisocyanate and 10 to 100 parts by weight of a vinyl monomer per 100 parts of diisocyanate;

(3) one or more aliphatic or cycloaliphatic diamines; and, optionally, (4) a saturated or olefinically unsaturated compound having monofunctional reactivity towards isocyanates;

by preparing a prepolymer containing from about 1 to 5%, by weight, of NCO-groups from components (1) and (2) in a first stage, reacting the prepolymer dissolved in the polymerizable monomeric ester of methacrylic acid in a second stage with component (3) in an isocyanate:amino-equivalent ratio of between about 1.01:1 and 1.5:1, optionally in the presence of more copolymerizable vinyl monomers, until an about 20% solution of polyurethane urea in the monomer would have a viscosity of from about 200 to 30,000 cP at 20° C., optionally reacting any free NCO-groups still present in a third reaction stage by adding component (4), adjusting the solids content of the solution to from about 8 to 60%, by weight, optionally by adding more vinyl monomers, and finally subjecting the mixture to radically initiated polymerization in known manner, optionally in molds.

16. The process of claim 15 wherein said diisocyanate used for preparing the graft polymerization products is hexamethylene diisocyanate, 2,2,4- and/or 2,4,4-trimethyl hexamethylene diisocyanate, cyclohexane diisocyanate, methyl cyclohexane diisocyanate, bicyclohexyl methane diisocyanate or isophorone diisocyanate.

17. The product of the process of claim 15 or 16.

18. The composition of claim 11 wherein the component (4) is a monoalcohol or primary or secondary alkylamine.

19. The product of the process of claim 7.

* * * * *